(12) United States Patent
Saga

(10) Patent No.: US 10,333,406 B2
(45) Date of Patent: Jun. 25, 2019

(54) ELECTRIC POWER CONVERTER PROVIDING OUTPUTS BY ADJUSTING FIRST RECTIFIED OUTPUT VOLTAGE BY CHOPPER CIRCUIT AND ADJUSTING SECOND RECTIFIED OUTPUT VOLTAGE BY DC-DC CONVERTER

(71) Applicant: FUJI ELECTRIC CO., LTD., Kanagawa (JP)

(72) Inventor: Yasunao Saga, Tokyo (JP)

(73) Assignee: FUJI ELECTRIC CO., LTD., Kawasaki-shi, Kanagawa (JP)

(*) Notice: Subject to any disclaimer, the term of this patent is extended or adjusted under 35 U.S.C. 154(b) by 0 days.

(21) Appl. No.: 16/111,759

(22) Filed: Aug. 24, 2018

(65) Prior Publication Data

US 2019/0131874 A1 May 2, 2019

(30) Foreign Application Priority Data

Oct. 31, 2017 (JP) ................. 2017-210976

(51) Int. Cl.
*H02M 3/335* (2006.01)
*H02M 7/48* (2007.01)
*H02M 1/00* (2006.01)
*H02M 3/158* (2006.01)

(52) U.S. Cl.
CPC ....... *H02M 3/158* (2013.01); *H02M 3/33507* (2013.01); *H02M 3/33561* (2013.01); *H02M 2001/007* (2013.01); *H02M 2001/008* (2013.01); *H02M 2001/009* (2013.01); *H02M 2001/0067* (2013.01); *H02M 2007/4815* (2013.01)

(58) Field of Classification Search
CPC ..... H02M 2001/008; H02M 2001/009; H02M 2001/0074; H02M 1/4208; H02M 1/4258; H02M 7/493
See application file for complete search history.

(56) References Cited

U.S. PATENT DOCUMENTS

2010/0046251 A1* 2/2010 Kyono ............. H02M 3/33561
363/21.02
2018/0067444 A1* 3/2018 Ogishima ............. G03G 15/80

FOREIGN PATENT DOCUMENTS

JP 2016-127680 7/2016

* cited by examiner

*Primary Examiner* — Alex Torres-Rivera
*Assistant Examiner* — David A. Singh
(74) *Attorney, Agent, or Firm* — IPUSA, PLLC

(57) ABSTRACT

An electric power converter includes a chopper circuit, a DC-DC converter coupled to an output of the chopper circuit, a first transformer including a first primary coil and a first secondary coil, a second transformer including a second primary coil and a second secondary coil, a first capacitor coupled between an output of the DC-DC converter and the first primary coil, a second capacitor coupled between the output of the DC-DC converter and the second primary coil, a first rectifier circuit coupled to the first secondary coil, and a second rectifier circuit coupled to the second secondary coil. A first output voltage of the first rectifier circuit is adjusted by adjusting an output voltage of the chopper circuit, and a second output voltage of the second rectifier circuit is adjusted by adjusting a powering time during one switching period of the DC-DC converter.

9 Claims, 7 Drawing Sheets

ELECTRIC POWER CONVERTER PROVIDING OUTPUTS BY ADJUSTING FIRST RECTIFIED OUTPUT VOLTAGE BY CHOPPER CIRCUIT AND ADJUSTING SECOND RECTIFIED OUTPUT VOLTAGE BY DC-DC CONVERTER

CROSS-REFERENCE TO RELATED APPLICATION

This application is based upon and claims the benefit of priority of the prior Japanese Patent Application No. 2017-210976, filed on Oct. 31, 2017, the entire contents of which are incorporated herein by reference.

BACKGROUND OF THE INVENTION

1. Field of the Invention

The disclosures herein are related to an electric power converter. The electric power converter is also sometimes referred to as an electric power conditioner.

2. Description of the Related Art

An example of the electric power converter includes a plurality of combinational circuits. Each combinational circuit includes a boost chopper and an inverter that are connected in series. The boost chopper boosts DC (Direct-Current) electric power supplied from an overhead wiring via a current collector into a predetermined voltage value. The inverter converts the DC electric power output from the boost chopper into AC (Alternating-Current) electric power. A capacitor that accumulates electric power for contact loss compensation is connected in parallel to the combinational circuits. In addition, a discharge resistor and a discharge contactor are connected in series to form a series circuit, and this series circuit is connected in parallel to the capacitor. The boost choppers include switching devices that are driven simultaneously, and a single boost coil is used in common by the boost choppers to perform a boost operation. This example of the electric power converter is proposed in Japanese Laid-Open Patent Publication No. 2016-127680, for example.

The conventional electric power converter includes a plurality of boost choppers. For this reason, the conventional electric power converter has a complex configuration.

SUMMARY OF THE INVENTION

Accordingly, it is an object in one aspect of the embodiments to provide an electric power converter that has a simple configuration.

According to one aspect of the embodiments, an electric power converter includes a chopper circuit that converts DC power into DC power at a predetermined voltage, a DC-DC converter coupled to an output side of the chopper circuit, a first transformer, coupled to an output side of the DC-DC converter, and including a first primary coil and a first secondary coil, a second transformer, coupled to the output side of the DC-DC converter, and including a second primary coil and a second secondary coil, a first capacitor coupled in series between the output side of the DC-DC converter and the first primary coil, a second capacitor coupled in series between the output side of the DC-DC converter and the second primary coil, a first rectifier circuit coupled to the first secondary coil, and a second rectifier circuit coupled to the second secondary coil, wherein a first output voltage of the first rectifier circuit is adjusted by adjusting an output voltage of the chopper circuit, and a second output voltage of the second rectifier circuit is adjusted by adjusting a powering time during one switching period of the DC-DC converter.

The object and advantages of the embodiments will be realized and attained by means of the elements and combinations particularly pointed out in the claims.

It is to be understood that both the foregoing general description and the following detailed description are exemplary and explanatory and not restrictive of the invention, as claimed.

DESCRIPTION OF EMBODIMENTS

Figure 1:
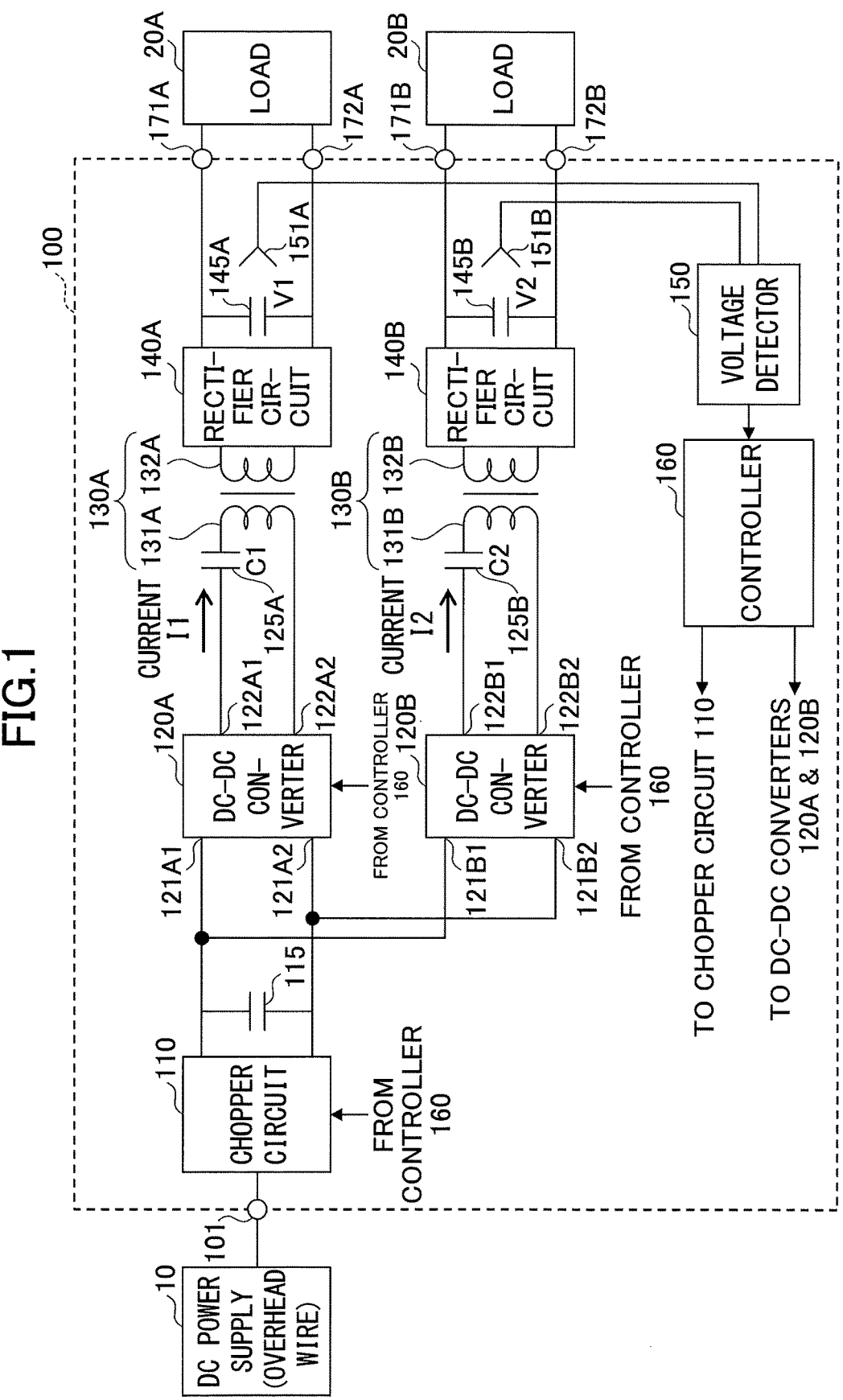
FIG. 1 is a diagram illustrating an example of an electric power converter in a first embodiment.

Preferred embodiments of the present invention will be described with reference to the accompanying drawings. In the drawings, those parts that are the same are designated by the same reference numerals, and a repeated description of the same parts may be omitted.

A description will now be given of the electric power converter in each embodiment according to the present invention.

[First Embodiment]

FIG. 1 is a diagram illustrating an example of the electric power converter in a first embodiment. An electric power converter 100 illustrated in FIG. 1 includes an input terminal 101, a chopper circuit 110, a smoothing capacitor 115, DC-DC converters 120A and 120B, capacitors 125A and 125B, transformers 130A and 130B, rectifier circuits 140A and 140B, smoothing capacitors 145A and 145B, a voltage detector 150, voltage sensors 151A and 151B, a controller 160, and output terminals 171A, 171B, 172A, and 172B.

In this example, the electric power converter 100 is mounted on a train, and DC electric power is supplied from a DC power supply 10 that is formed by the overhead wire, via the input terminal 101. The DC electric power is converted into DC electric power at two kinds of voltages that are supplied to a load 20A via the output terminals 171A and 172A, and to a load 20B via the output terminals 171B and 172B, respectively.

In Japan, for example, a rated voltage of the DC electric power supplied from the overhead wire is 1500 V. However, the voltage of the DC electric power supplied from the overhead wire may vary in a range of approximately 900 V to approximately 1800 V.

The load 20A and the load 20B are devices having different driving voltages. In this example, the voltage of the DC electric power supplied to the load 20A is higher than the voltage of the DC electric power supplied to the load 20B. For example, the voltage of the DC electric power supplied from the output terminals 171A and 172A to the load 20A is 700 V, and the voltage of the DC electric power supplied from the output terminals 171B and 172B to the load 20B is 400 V. An example of the load 20A is an air conditioner that adjusts cabin temperature and humidity of the train, or the like. On the other hand, an example of the load 20B is a lighting system or the like provided in the cabin of the train.

The input terminal 101 is the terminal through which the DC electric power is input to the electric power converter 100, and the input terminal 101 is connected to the DC power supply 10. More particularly, the input terminal 101 is connected to a pantograph of the train, and the pantograph makes contact with the overhead wire as the train travels. Hence, the DC electric power supplied from DC power supply 10 that is formed by the overhead wire is input to the electric power converter 100 via the input terminal 101.

The chopper circuit 110 is connected to an output side of the input terminal 101. A PWM (Pulse Width Modulation) driving signal from the controller 160 is supplied to the chopper circuit 110. The chopper circuit 110 is driven and controlled by the PWM driving signal, to convert the DC electric power that is supplied from the DC power supply 10 via the input terminal 101, into DC electric power at a predetermined voltage value.

In this example, the predetermined voltage is 1100 V, and the chopper circuit 110 is a buck-boost type chopper circuit.

The chopper circuit 110 is not limited to a particular type of chopper circuit, as long as switching devices of the chopper circuit 110 can be switched by the PWM driving signal to convert the DC electric power that is input from the input terminal 101 into the DC electric power at the predetermined voltage. A switching frequency of the chopper circuit 110 is 5 kHz, for example.

The smoothing capacitor 115 is connected between two output terminals of the chopper circuit 110, to smooth an output voltage of the chopper circuit 110.

The DC-DC converter 120A is connected to the output side of the chopper circuit 110 via the smoothing capacitor 115. A driving signal from the controller 160 is supplied to the DC-DC converter 120A. The DC-DC converter 120A is driven and controlled by the driving signal. The DC-DC converter 120A includes input terminals 121A1 and 121A2, and output terminals 122A1 and 122A2.

Figure 2:
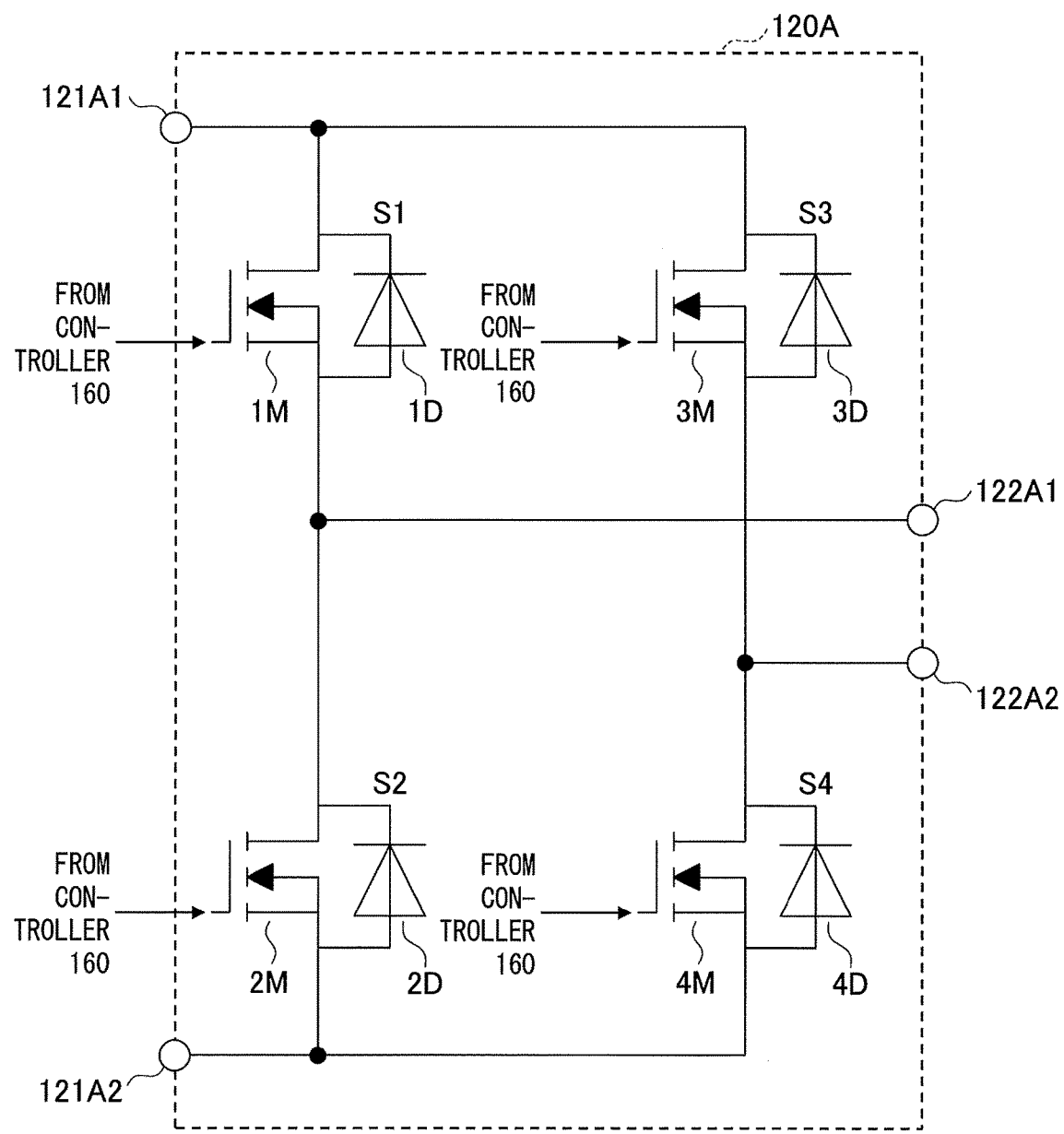
FIG. 2 is a diagram illustrating an example of a circuit configuration of a DC-DC converter.

Next, a circuit configuration of the DC-DC converter 120A will be described with reference to FIG. 2. FIG. 2 is a diagram illustrating an example of the circuit configuration of the DC-DC converter.

As illustrated in FIG. 2, the DC-DC converter 120A includes switches S1, S2, S3, and S3, the input terminals 121A1 and 121A2, and the output terminals 122A1 and 122A2. The switch S1 is a semiconductor switching device including a transistor 1M and a diode, and the switch S2 is a semiconductor switching device including a transistor 2M and a diode 2D. The switch S3 is a semiconductor switching device including a transistor 3M and a diode 3D, and the switch S4 is a semiconductor switching device including, a transistor 4M and a diode 4D.

Each of the transistors 1M, 2M, 3M, and 4M is a N-channel MOSFET (Metal Oxide Semiconductor Field Effect Transistor) that is driven and controlled by the driving signal from the controller 160. More particularly, the N-channel MOSFET is switched and controlled by a gate driving signal from the controller 160, to assume an ON state or an OFF state. The switches S1, S2, S3, and S4 are switched between the ON state and the OFF state by switching the transistors 1M, 2M, 3M, and 4M between the ON state and the OFF state, respectively.

The diode 1D is a return path capacitor in an antiparallel connection to the transistor 1M, and the diode 2D is a return path capacitor in an antiparallel connection to the transistor 2M. The diode 3D is a return path capacitor in an antiparallel connection to the transistor 3M, and the diode 4D is a return path capacitor in an antiparallel connection to the transistor 4M. The gate driving signal from the controller 160 is input to the transistors 1M, 2M, 3M, and 4M.

A drain of the transistor 1M is connected to the input terminal 121A1. A source of the transistor 1M is connected to a drain of the transistor 2M and to the output terminal 122A1. The transistor 1M in the ON state causes a current to flow from the input terminal 121A1 to the output terminal 122A1. A cathode and an anode of the diode 1D are connected to the drain and the source of the transistor 1M, respectively.

A source of the transistor 2M is connected to the input terminal 121A2. A drain of the transistor 2M is connected to the source of the transistor 1M and the output terminal 122A1. The transistor 2M in the ON state causes a current to flow from the output terminal 122A1 to the input terminal 121A1. A cathode and an anode of the diode 2D are connected to the drain and the source of the transistor 2M, respectively.

A drain of the transistor 3M is connected to the input terminal 121A1. A source of the transistor 3M is connected to a drain of the transistor 4M and to the output terminal 122A2. The transistor 3M in the ON state causes a current to flow from the input terminal 121A1 to the output terminal 122A2. A cathode and an anode of the diode 3D are connected to the drain and the source of the transistor 3M, respectively.

A source of the transistor 4M is connected to the input terminal 121A2. A drain of the transistor 4M is connected to the source of the transistor 3M and the output terminal 122A2. The transistor 4M in the ON state causes a current to flow from the output terminal 122A2 to the input terminal 121A2. A cathode and an anode of the diode 4D are connected to the drain and the source of the transistor 4M, respectively.

In the DC-DC converter 120A having the configuration described above, the switches S1, S2, S3, and S4 are switched between the ON state and the OFF state for every switching period. More particularly, a group of the switches S1 and S4, and a group of the switches S2 and S3 are switched separately at mutually inverted phases for every switching period.

In other words, the switches S2 and S3 are turned OFF during an interval during which the switches S1 and S4 are turned ON. In addition, the switches S1 and S4 are turned OFF during an interval during which the switches. S2 and S3 are turned ON.

One switching period includes an interval $T_{S1,S4ON}$ during which the switches S1 and S4 are turned ON (the switches S2 and S3 are turned OFF), a dead time DT, an interval $T_{S2,S3ON}$ during which the switches S2 and S3 are turned ON (the switches S1 and S4 are turned OFF), and a dead time DT.

In each switching period, a length of time of the interval $T_{S1,S4ON}$ during which the switches S1 and S4 are turned ON, and a length of time of the interval $T_{S2,S3ON}$ during which the switches S2 and S3 are turned ON is controlled by the controller 160. The interval $T_{S1,S4ON}$ during which the switches S1 and S4 are turned ON is the time during which a current flows through the switches S1 and S4. The interval $T_{S2,S3ON}$ during which the switches S2 and S3 are turned ON is the time during which a current flows through the switches S2 and S3. Hence, the intervals $T_{S1,S4ON}$ and $T_{S2,S3ON}$ will hereinafter also be referred to as powering times.

The DC-DC converter 120A is controlled as described above to convert the voltage of the DC electric power input to the input terminals 121A1 and 121A2 into a desired voltage that is output via the output terminals 122A1 and 122A2. By controlling the switching of the DC-DC converter 120A, a current I1 output from the DC-DC converter 120A, that forms an example of a first current, becomes a high-frequency current.

In the first embodiment, the powering time during which the switches S1 and S4 are turned ON and the powering time during which the switches S2 and S3 are turned ON in the DC-DC converter 120A are set to a constant value for all switching periods.

The DC-DC converters 120A and 120B form an example of a DC-DC converter, and the DC-DC converter 120A forms an example of a first converter of the DC-DC converter.

The DC-DC converter 120B is connected to the output side of the chopper circuit 110 via the smoothing capacitor 115, in parallel to the DC-DC converter 120A. The driving signal from the controller 160 is supplied to the DC-DC converter 120B. The DC-DC converter 120B is driven and controlled by the driving signal. The DC-DC converter 120B includes input terminals 121B1 and 121B2, and output terminals 122B1 and 122B2. The DC-DC converter 120B forms an example of a second converter of the DC-DC converter.

The circuit configuration of the DC-DC converter 120B is the same as the circuit configuration of the DC-DC converter 120A illustrated in FIG. 2, and thus, an illustration and description thereof will be omitted. It is assumed in the following description that the group of the switches S1 and S4, and the group of the switches S2 and S3 forming the DC-DC converter 120B are also switched separately at mutually inverted phases for every switching period. By controlling the switching of the DC-DC converter 120B, a current I2 output from the DC-DC converter 120B, that forms an example of a second current, becomes a high-frequency current.

Unlike the DC-DC converter 120A, the DC-DC converter 120B adjusts (or controls) the powering time of the switches S1 and S4 and the powering time of the switches S2 and S3 during one switching period, to adjust (or control) the voltage of the DC electric power that is input from the chopper circuit 110, as will be described later in more detail.

The capacitor 125A is inserted in series between the DC-DC converter 120A and a primary coil 131A of the transformer 130A. The capacitor 125A is provided to set a resonance frequency f1 of the current I1 flowing between the DC-DC converter 120A and the primary coil 131A. The resonance frequency f1 of the current I1 is determined by an electrostatic capacitance C1 of the capacitor 125A and a leak inductance L1 of the transformer 130A.

The capacitor 125B is inserted in series between the DC-DC converter 120B and a primary coil 131B of the transformer 130B. The capacitor 125B is provided to set a resonance frequency f2 of the current I2 flowing between the DC-DC converter 120B and the primary coil 131B. The resonance frequency f2 of the current I2 is determined by an electrostatic capacitance C2 of the capacitor 125B and a leak inductance L2 of the transformer 130B.

The resonance frequency f1 of the current I1 is set higher than the resonance frequency f2 of the current I2. The frequencies f1 and f2 can be set by setting the electrostatic capacitances C1 and C2 and the leak inductances L1 and L2 to appropriate values.

The transformer 130A is a high-frequency isolation type transformer having a primary coil 131A and a secondary coil 132A. Two ends of the primary coil 131A are connected to the output terminals 122A1 and 122A2 of the DC-DC converter 120A, respectively. Two ends of the secondary coil 132A are connected to two input terminals of the rectifier circuit 140A, respectively.

For example, a turn ratio of the primary coil 131A and the secondary coil 132A is 11:7. In a case in which the voltage of the high-frequency power input from the DC-DC converter 120A is 1100 V, the transformer 130A outputs high-frequency power at 700 V to the rectifier circuit 140A.

The transformer 130A forms an example of a first transformer. The primary coil 131A forms an example of a first primary coil, and the secondary coil 132A forms an example of a first secondary coil.

The transformer 130B is an isolation type transformer having a primary coil 131B and a secondary coil 132B. Two ends of the primary coil 131B are connected to the output terminals 122B1 and 122B2 of the DC-DC converter 120B, respectively. Two ends of the secondary coil 132B are connected to two input terminals of the rectifier circuit 140B, respectively.

For example, a turn ratio of the primary coil 131B and the secondary coil 132B is 11:4. In a case in which the voltage of the high-frequency power input from the DC-DC converter 120B is 1100 V, the transformer 130B outputs high-frequency power at 400 V to the rectifier circuit 140B.

The transformer 130B forms an example of a second transformer. The primary coil 131B forms an example of a second primary coil, and the secondary coil 132B forms an example of a second secondary coil.

The rectifier circuit 140A is connected to the secondary coil 132A, and an output side of the rectifier circuit 140A is connected to the output terminals 171A and 172A via the smoothing capacitor 145A. The rectifier circuit 140A has a circuit configuration including four diodes connected in a bridge connection. The rectifier circuit 140A rectifies the high-frequency power input from the secondary coil 132A, and outputs the rectified power. The rectifier circuit 140A forms an example of a first rectifier circuit.

The rectifier circuit 140B is connected to the secondary coil 132B, and an output side of the rectifier circuit 140B is connected to the output terminals 171B and 172B via the smoothing capacitor 145B. The rectifier circuit 140B has a circuit configuration including four diodes connected in a bridge connection. The rectifier circuit 140B rectifies the high-frequency power input from the secondary coil 132B, and outputs the rectified power. The rectifier circuit 140B forms an example of a second rectifier circuit.

The smoothing capacitor 145A is connected between two output terminals of the rectifier circuit 140A, to smooth the power rectified by the rectifier circuit 140A. The smoothing capacitor 145B is connected between two output terminals of the rectifier circuit 140B, to smooth the power rectified by the rectifier circuit 140B.

The voltage detector 150 is connected to the voltage sensors 151A and 151B. The voltage sensor 151A detects a voltage V1 between two terminals of the smoothing capacitor 145A (or a terminal voltage V1 of the smoothing capacitor 145A). The voltage sensor 151B detects a voltage V2 between two terminals of the smoothing capacitor 145B (or a terminal voltage V2 of the smoothing capacitor 145B). The voltage detector 150 supplies to the controller 160 a signal representing the terminal voltage V1 of the smoothing capacitor 145A and a signal representing the terminal voltage V2 of the smoothing capacitor 145B.

The terminal voltage V1 of the smoothing capacitor 145A is an output voltage that is output from the output terminals 171A and 172A. The terminal voltage V2 of the smoothing capacitor 145B is an output voltage that is output from the output terminals 171B and 172B.

The controller 160 controls the output voltage of the chopper circuit 110, and controls the output voltage of the DC-DC converters 120A and 120B, based on the terminal voltage V1 of the smoothing capacitor 145A and the terminal voltage V2 of the smoothing capacitor 145B detected by the voltage detector 150.

The output terminals 171A and 172A are connected to the two output terminals of the rectifier circuit 140A, respectively, via the smoothing capacitor 145A. Because the load 20A is connected to the output terminals 171A and 172A, the output terminals 171A and 172A output the DC electric power at a predetermine voltage value to the load 20A. In this example, the output voltage V1 of the output terminals 171A and 172A is 700 V.

The output terminals 171B and 172B are connected to the two output terminals of the rectifier circuit 140B, respectively, via the smoothing capacitor 145B. Because the load 20B is connected to the output terminals 171B and 172B, the output terminals 171B and 172B output the DC electric power at a predetermine voltage value to the load 20B. In this example, the output voltage V2 of the output terminals 171B and 172B is 400 V.

In the electric power converter 100 having the configuration described above, the output voltage V1 is adjusted by adjusting the output voltage of the chopper circuit 110 in a state in which the powering times during which the DC-DC converter 120A turns ON the switches S1 and S4 thereof and the DC-DC converter 120A turns ON the switches S2 and S3 thereof are maintained to a constant value.

More particularly, in a case in which the output voltage V1 is lower than 700 V, the controller 160 performs a feedback control using the terminal voltage V1 detected by the voltage detector 150, to adjust and raise the output voltage of the chopper circuit 110 to 700 V. In addition, in a case in which the output voltage V1 is higher than 700 V, the controller 160 performs a feedback control using the terminal voltage V1 detected by the voltage detector 150, to adjust and lower the output voltage of the chopper circuit 110 to 700 V.

Further, in the electric power converter 100 having the configuration described above, the output voltage V2 is adjusted by adjusting the powering times during which the DC-DC converter 120B turns ON the switches S1 and S4 thereof and the DC-DC converter 120B turns ON the switches S2 and S3 thereof.

When the output voltage of the chopper circuit 110 is raised or lowered in order to adjust the output voltage V1, the voltage input to the input terminals 121B1 and 121B2 of the DC-DC converter 120B is also raised or lowered. In other words, the input voltage of the DC-DC converter 120B is affected by the output voltage of the chopper circuit 110 that is raised or lowered.

For example, in a case in which the output voltage V1 is 690 V and the output voltage of the chopper circuit 110 is raised so that the output voltage V1 is adjusted to 700 V, the output voltage V2 may become 420 V if the powering time of the DC-DC converter 120B is fixed without adjustment. In addition, in a case in which the output voltage V1 is 710 V and the output voltage of the chopper circuit 110 is lowered so that the output voltage V1 is adjusted to 700 V, the output voltage V2 may become 380 V if the powering time of the DC-DC converter 120B is fixed without adjustment.

In the electric power converter 100, the powering time of the DC-DC converter 120B is adjusted in such cases, in order to adjust the output voltage V2 to 400 V.

Figure 3:
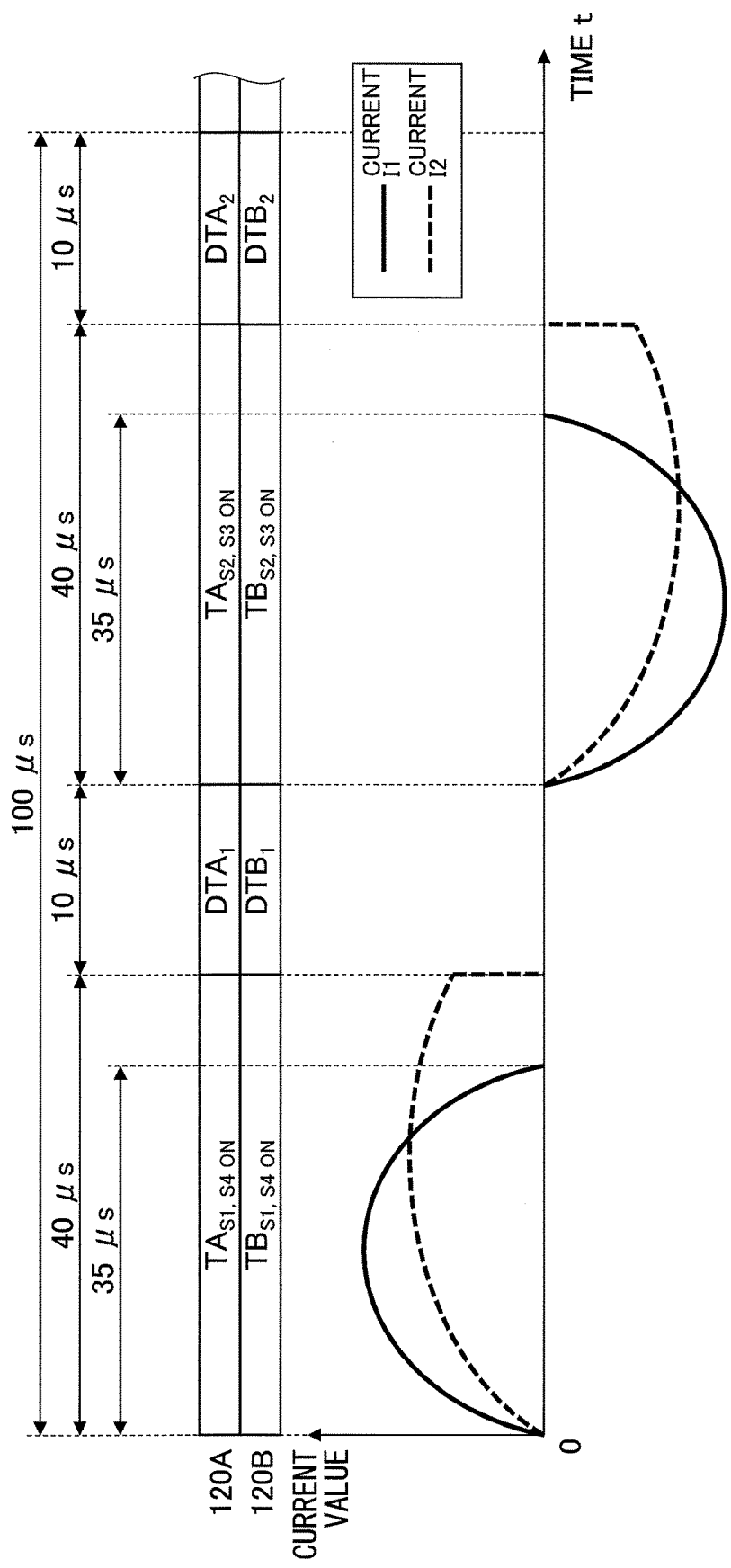
FIG. 3 is a diagram illustrating examples of output currents of DC-DC converters.
Figure 4:
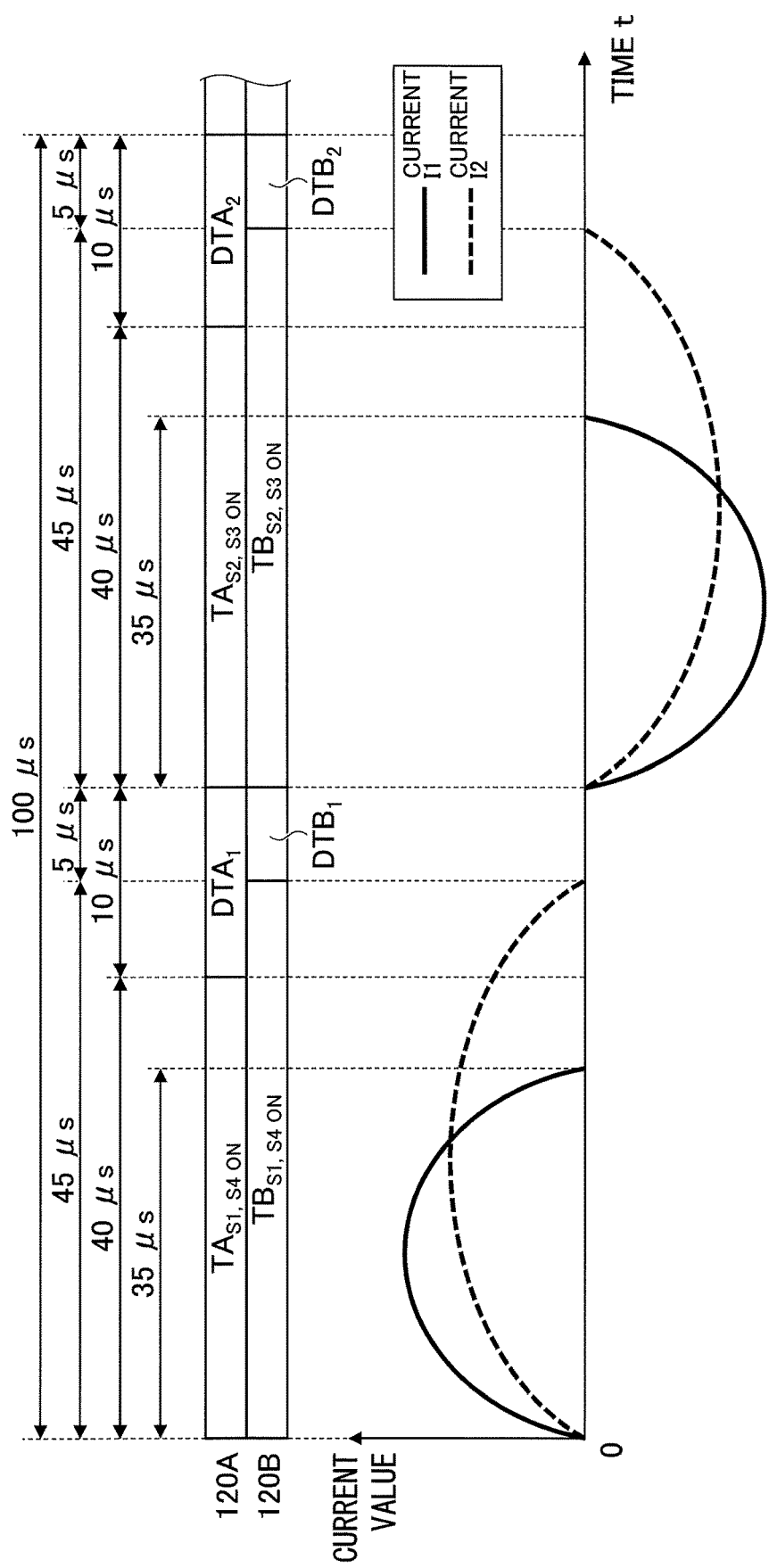
FIG. 4 is a diagram illustrating examples of the output currents of the DC-DC converters.
Figure 5:
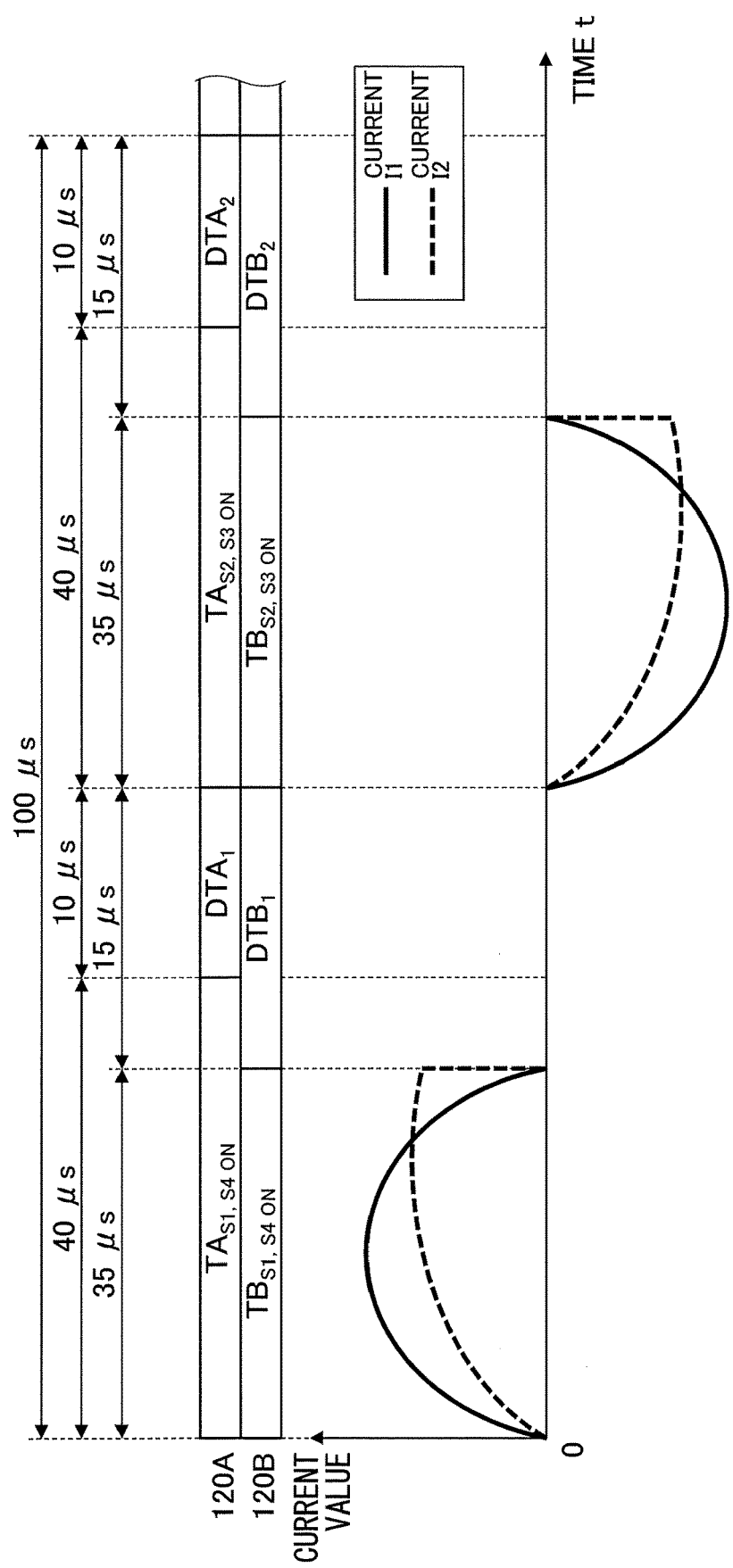
FIG. 5 is a diagram illustrating examples of the output currents of the DC-DC converters.

Next, an operation of the electric power converter 100 will be described by referring to FIG. 3 through FIG. 5. FIG. 3 through FIG. 5 are diagrams illustrating examples of output currents of the DC-DC converters. FIG. 3 through FIG. 5 illustrate the output currents I1 and I2 of the DC-DC converters 120A and 120B. In FIG. 3 through FIG. 5, the abscissa indicates a time t, and the ordinate indicates a current value. In addition, a waveform of the current I1 is indicated by a solid line, and a waveform of the current I2 is indicated by a dotted line.

For the sake of convenience, it is assumed in FIG. 3 through FIG. 5 that the DC-DC converters 120A and 120B have a common switching period of 100 µs (micro seconds).

In addition, in one switching period of the DC-DC converter 120A, it is assumed that each of the two powering times $TA_{S1,S4ON}$ and $TA_{S2,S3ON}$ is fixed to 40 µs, and each of two dead times $DTA_1$ and $DTA_2$ is fixed to 10 µs. Further, it is assumed that a half-period of the resonance period of the current I1 is 35 µs.

In one switching period of the DC-DC converter 120A, the switches S1 and S4 of the DC-DC converter 120A are turned ON during the first powering time $TA_{S1,S4ON}$, the dead time $DTA_1$ of 10 µs is provided, the switches S2 and S3 of the DC-DC converter 120A are turned ON during the second powering time $TA_{S2,S3ON}$, and the dead time $DTA_2$ of 10 µs is provided, in this order. In other words, the switching of the switches S1 and S4 of the DC-DC converter 120A, and the switching of the switches S2 and S3 of the DC-DC converter 120A are performed during one switching period.

FIG. 3 illustrates the waveforms of the currents I1 and I2, and driven states of the DC-DC converters 120A and 120B, in a case in which the powering time of the DC-DC converter 120B is set to an initial state. The driven state of the DC-DC converter 120A includes the powering time $TA_{S1,S4ON}$ during which the switches S1 and S4 of the DC-DC converter 120A are turned ON, the dead time $DTA_1$, the powering time $TA_{S2,S3ON}$ during which the switches S2 and S3 of the DC-DC converter 120A are turned ON, and the dead time $DTA_2$. The driven state of the DC-DC converter 120B includes the powering time $TB_{S1,S4ON}$ during which the switches S1 and S4 of the DC-DC converter 120B are turned ON, the dead time $DTB_1$, the powering time $TB_{S2,S3ON}$ during which the switches S2 and S3 of the DC-DC converter 120B are turned ON, and the dead time $DTB_2$.

In the initial state, the powering times $TB_{S1,S4ON}$ and $TB_{S2,S3ON}$ of the DC-DC converter 120B are 40 µs, and the dead times $DTB_1$ and $DTB_2$ are 10 µs. A minimum value of the dead times $DTB_1$ and $DTB_2$ is 5 µs, and cannot be made shorter. A maximum value of the dead times $DTB_1$ and $DTB_2$ is 15 µs, and cannot be made longer.

Because the resonance frequency f1 of the current I1 is higher than the resonance frequency f2 of the current I2, the period of the current I1 is shorter than the period of the current I2. For example, the half-period of the current I1 is 35 µs, and the half-period of the current I2 is 45 µs.

In the initial state illustrated in FIG. 3, the half-period (35 µs) of the current I1 is shorter than the powering times $TA_{S1,S4ON}$ and $TA_{S2,S3ON}$ (40 µs) of the DC-DC converter 120A, and the waveform of the current I1 in the half-period falls entirely within each of the powering times $TA_{S1,S4ON}$ and $TA_{S2,S3ON}$. On the other hand, the half-period (45 μs) of the current I2 is longer than the powering times $TB_{S1,S4ON}$ and $TB_{S2,S3ON}$ (40 μs) of the DC-DC converter 120B, and the waveform of the current I2 in the half-period does not fall within each of the powering times $TB_{S1,S4ON}$ and $TB_{S2,S3ON}$. In other words, the waveform of the current I2 at the last portion of the half-period is missing, as illustrated in FIG. 3.

When the powering times $TB_{S1,S4ON}$ and $TB_{S2,S3ON}$ of the DC-DC converter 120B are made longer, the time during which the current I2 flows becomes longer, and it becomes possible to raise the output voltage V2. In addition, when the powering times $TB_{S1,S4ON}$ and $TB_{S2,S3ON}$ of the DC-DC converter 120B are made shorter, the time during which the current I2 flows becomes shorter, and it becomes possible to lower the output voltage V2.

FIG. 4 illustrates a state in which the powering times $TB_{S1,S4ON}$ and $TB_{S2,S3ON}$ of the DC-DC converter 120B are 45 μs and made longer than those in the initial state illustrated in FIG. 3. In the state illustrated in FIG. 4, the dead times $DTB_1$ and $DTB_2$ of the DC-DC converter 120B are set to the minimum value of 5 μs.

In the state illustrated in FIG. 4, the half-period (35 μs) of the current I1 is shorter than the powering times $TA_{S1,S4ON}$ and $TA_{S2,S3ON}$ (40 μs) of the DC-DC converter 120A, and the waveform of the current I1 in the half-period falls entirely within each of the powering times $TA_{S1,S4ON}$ and $TA_{S2,S3ON}$. In addition, the half-period (45 μs) of the current I2 is equal to the powering times $TB_{S1,S4ON}$ and $TB_{S2,S3ON}$ (45 μs) of the DC-DC converter 120B, and the waveform of the current I2 in the half-period falls entirely within each of the powering times $TB_{S1,S4ON}$ and $TB_{S2,S3ON}$.

Accordingly, when the powering times $TB_{S1,S4ON}$ and $TB_{S2,S3ON}$ of the DC-DC converter 120B are made longer, the time during which the current I2 flows becomes longer, and it becomes possible to raise the output voltage V2.

FIG. 5 illustrates a state in which the powering times $TB_{S1,S4ON}$ and $TB_{S2,S3ON}$ of the DC-DC converter 120B are 35 μs and made shorter than those in the initial state illustrated in FIG. 3. In the state illustrated in FIG. 5, the dead times $DTB_1$ and $DTB_2$ of the DC-DC converter 120B are set to the maximum value of 15 μs.

In the state illustrated in FIG. 5, the half-period (35 μs) of the current I1 is shorter than the powering times $TA_{S1,S4ON}$ and $TA_{S2,S3ON}$ (40 μs) of the DC-DC converter 120A, and the waveform of the current I1 in the half-period falls entirely within each of the powering times $TA_{S1,S4ON}$ and $TA_{S2,S3ON}$. On the other hand, the half-period (45 μs) of the current I2 is shorter than the powering times $TB_{S1,S4ON}$ and $TB_{S2,S3ON}$ (35 μs) of the DC-DC converter 120B, and the waveform of the current I2 in the half-period does not fall within each of the powering times $TB_{S1,S4ON}$ and $TB_{S2,S3ON}$. In other words, the waveform of the current I2 at the last portion of the half-period is missing, as illustrated in FIG. 5.

Accordingly, when the powering times $TB_{S1,S4ON}$ and $TB_{S2,S3ON}$ of the DC-DC converter 120B are made shorter, the time during which the current I2 flows becomes shorter, and it becomes possible to lower the output voltage V2.

As described above, the half-period (35 μs) of the current I1 is shorter than the powering times $TA_{S1,S4ON}$ and $TA_{S2,S3ON}$ (40 μs) of the DC-DC converter 120A, and the waveform of the current I1 in the half-period falls entirely within each of the powering times $TA_{S1,S4ON}$ and $TA_{S2,S3ON}$. For this reason, the output voltage V1 can be adjusted by adjusting the output voltage of the chopper circuit 110.

In addition, with regard to the current I2, the time during which the current I2 flows can be set to the half-period (45 μs) of the current I2 or shorter, by adjusting the powering times $TB_{S1,S4ON}$ and $TB_{S2,S3ON}$ of the DC-DC converter 120B between 35 μs and 45 μs. Consequently, even when the output voltage of the chopper circuit 110 varies, it is possible to adjust the output voltage V2 by adjusting the powering times $TB_{S1,S4ON}$ and $TB_{S2,S3ON}$ of the DC-DC converter 120B.

According to the first embodiment described above, the resonance frequencies f1 an f2 of the output currents I1 and I2 of the DC-DC converters 120A and 120B satisfy the relationship f1>f2. Hence, the electric power converter 100 can adjust the output voltages V1 and V2 using a simple configuration that includes one chopper circuit 110 and two DC-DC converters 120A and 120B.

The first embodiment can thus provide the electric power converter 100 having the simple configuration that includes one chopper circuit 110 and two DC-DC converters 120A and 120B.

Although the resonance frequencies f1 and f2 of the output currents I1 and I2 of the DC-DC converters 120A and 120B satisfy the relationship f1>f2, the electric power converter 100 does not necessarily have to satisfy this relationship f1>f2.

By adjusting the powering times $TA_{S1,S4ON}$ and $TA_{S2,S3ON}$ of the DC-DC converter 120A to become less than or equal to the half-period of the resonance frequency f1 of the current I1, it becomes possible to adjust the output voltage of the DC-DC converter 120A with respect to the output voltage of the chopper circuit 110, and adjust the output voltage V1.

In this case, when the powering times $TA_{S1,S4ON}$ and $TA_{S2,S3ON}$ of the DC-DC converter 120A are set equal to the half-period of the resonance frequency f1 of the current I1, the output voltage of the chopper circuit 110 may be adjusted so that the output voltage V1 becomes 700 V or higher. This is because, in a case in which the output voltage of the chopper circuit 110 causes the output voltage V1 to become lower than 700 V when the powering times $TA_{S1,S4ON}$ and $TA_{S2,S3ON}$ of the DC-DC converter 120A are set equal to the half-period of the resonance frequency f1 of the current I1, the output voltage V1 cannot be adjusted to 700 V even when the powering times $TA_{S1,S4ON}$ and $TA_{S2,S3ON}$ of the DC-DC converter 120A are adjusted.

Further, in this case, the switching period of the DC-DC converter 120A may be different from the switching period of the DC-DC converter 120B.

The electric power converter 100 described above is mounted on the train. However, the use of the electric power converter 100 is not limited to the use on the train, and the electric power converter 100 may be used in systems other than the train. For example, the electric power converter 100 may be applied to PCSs (Power Conditioning Systems) for solar cells, fuel cells, or the like.

In the embodiment described above, the capacitor 125A is connected in series between the DC-DC converter 120A and the primary coil 131A, and the capacitor 125B is connected in series between the DC-DC converter 120B and the primary coil 131B.

Figure 6:
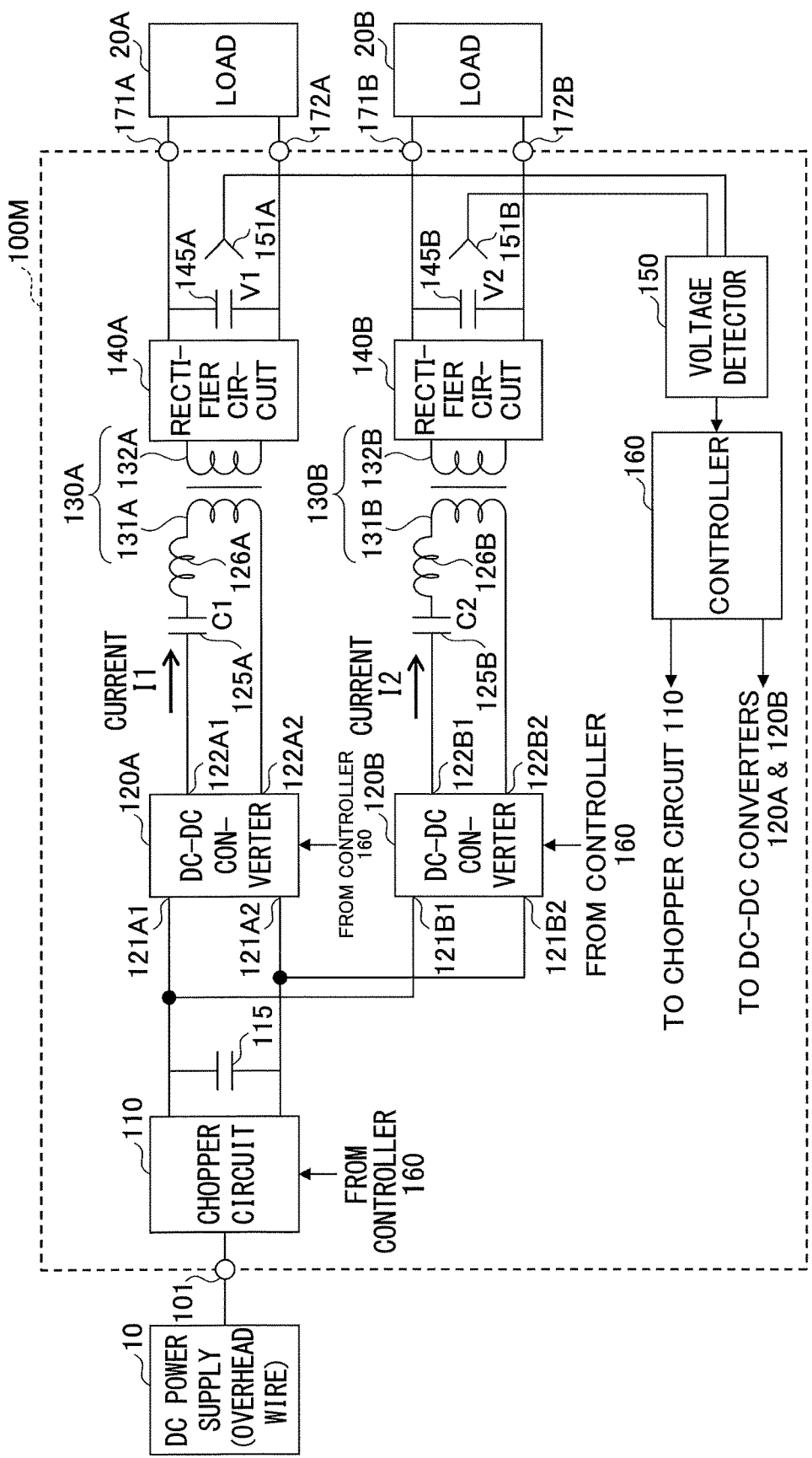
FIG. 6 is a diagram illustrating an example of the electric power converter in a modification of the first embodiment.

However, a reactor 126A may be connected in series to the capacitor 125A, and a reactor 126B may be connected in series to the capacitor 125B, as illustrated in FIG. 6.

FIG. 6 is a diagram illustrating an example of the electric power converter in a modification of the first embodiment. In FIG. 6, those parts that are the same as those corresponding parts in FIG. 1 are designated by the same reference numerals, and a description thereof will be omitted. In an electric power converter 100M illustrated in FIG. 6, the reactors 126A and 126B are provided in addition to the configuration illustrated in FIG. 1. The capacitor 125A and the reactor 126A are connected in series between the DC-DC converter 120A and the primary coil 131A, and the capacitor 125B and the reactor 126B are connected in series between the DC-DC converter 120B and the primary coil 131B.

More particularly, the reactor 126A is connected in series between the capacitor 125A and the primary coil 131A. The reactor 126A faults an example of a first reactor having a first inductance.

In addition, the reactor 126B is connected in series between the capacitor 125B and the primary coil 131B. The reactor 126B foams an example of a second reactor having a second inductance.

In the electric power converter 100M, the resonance frequency f1 of the current I1 is determined by the electrostatic capacitance C1 of the capacitor 125A, the inductance of the reactor 126A, and the leak inductance L1 of the transformer 130A. The resonance frequency f2 of the current I2 is determined by the electrostatic capacitance C2 of the capacitor 125B, the inductance of the reactor 126B, and the leak inductance L2 of the transformer 130B. The inductance of the reactor 126A may be set to an appropriate value according to a relationship between the resonance frequency f1 and the leak inductance L1 of the transformer 130A. The inductance of the reactor 126B may be set to an appropriate value according to a relationship between the resonance frequency f2 and the leak inductance L2 of the transformer 130B. For example, when the leak inductance L1 of the transformer 130A is insufficient for setting the resonance frequency f1, the reactor 126A may be additionally provided to positively set the resonance frequency f1. Similarly, when the leak inductance L2 of the transformer 130B is insufficient for setting the resonance frequency f2, the reactor 126B may be additionally provided to positively set the resonance frequency f2.

In the example illustrated in FIG. 6, the reactor 126A is connected in series between the capacitor 125A and the primary coil 131A, and the reactor 126B is connected in series between the capacitor 125B and the primary coil 131B. However, the reactor 126A may be connected in series between the DC-DC converter 120A and the capacitor 125A, and the reactor 126B may be similarly connected in series between the DC-DC converter 120B and the capacitor 125B.

The electric power converter 100M illustrated in FIG. 6 includes both the reactors 126A and 126B. However, the electric power converter 100M may have a configuration that includes only one of the reactors 126A and 126B.

[Second Embodiment]

Figure 7:
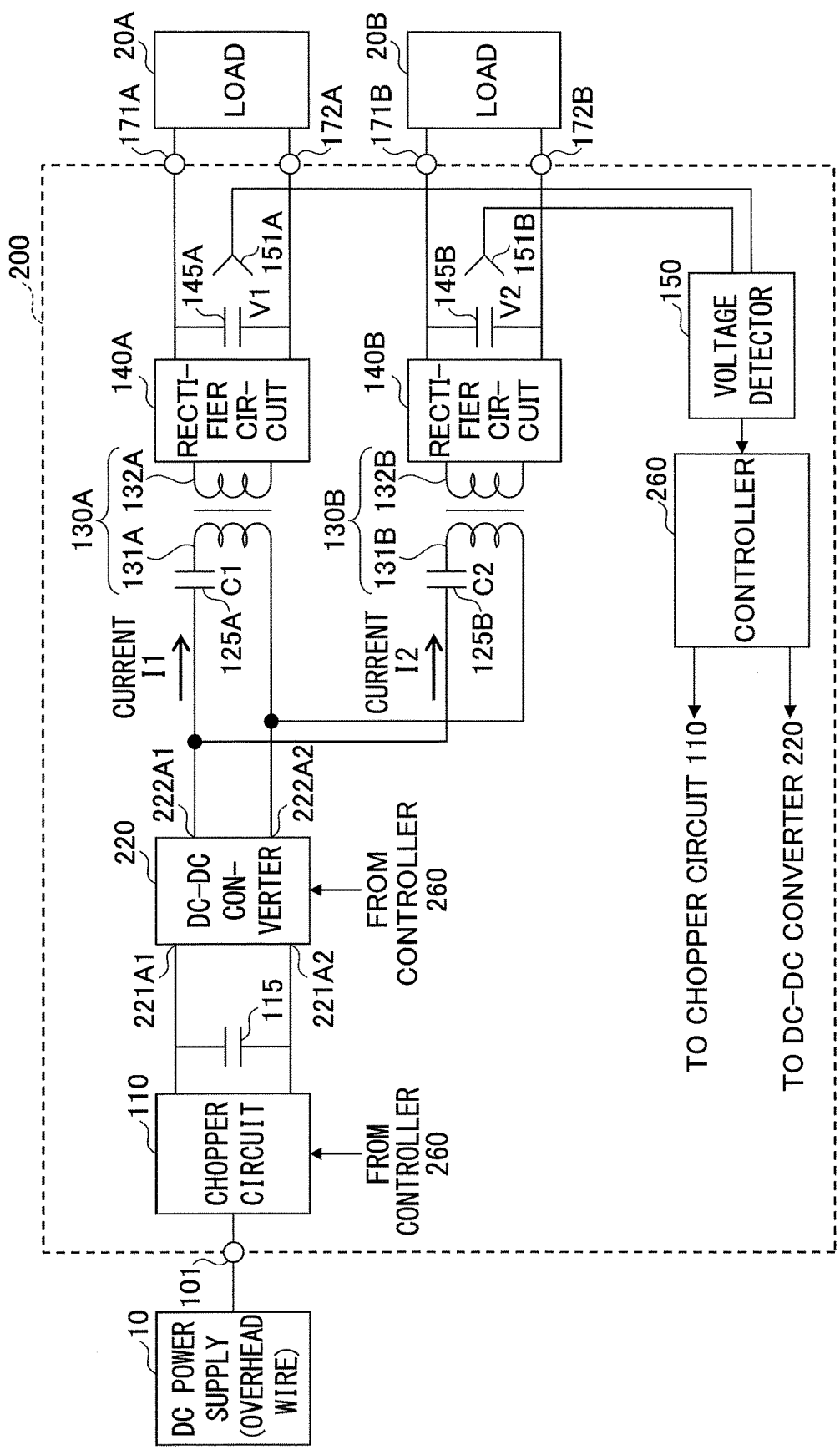
FIG. 7 is a diagram illustrating an example of the electric power converter in a second embodiment.

FIG. 7 is a diagram illustrating an example of the electric power converter in a second embodiment. An electric power converter 200 illustrated in FIG. 7 has a configuration in which the DC-DC converters 120A and 120B of the electric power converter 100 in the first embodiment illustrated in FIG. 1 are integrated into a single DC-DC converter 220. In FIG. 7, those parts that are the same as those corresponding parts in FIG. 1 are designated by the same reference numerals, and a description thereof will be omitted. In other words, a description of this second embodiment will focus on parts of the electric power converter 200 that are different from the parts of the electric power converter 100.

The electric power converter 200 includes the input terminal 101, the chopper circuit 110, the smoothing capacitor 115, the DC-DC converter 220, the capacitors 125A and 125B, the transformers 130A and 130B, the rectifier circuits 140A and 140B, the smoothing capacitors 145A and 145B, the voltage detector 150, the voltage sensors 151A and 151B, a controller 260, and the output terminals 171A, 171B, 172A, and 172B.

The DC-DC converter 220 is connected to the output side of the chopper circuit 110 via the smoothing capacitor 115. A driving signal from the controller 260 is supplied to the DC-DC converter 220. The DC-DC converter 220 is driven and controlled by the driving signal. The DC-DC converter 220 includes input terminals 221A1 and 221A2, and output terminals 222A1 and 222A2. The DC-DC converter 220 forms an example of a single DC-DC converter.

The input terminals 221A1 and 221A2 of the DC-DC converter 220 correspond to the input terminals 121A1 and 121A2 of the DC-DC converter 120A illustrated in FIG. 1, respectively. In addition, the output terminals 222A1 and 222A2 of the DC-DC converter 220 correspond to the output terminals 122A1 and 122A2 of the DC-DC converter 120A illustrated in FIG. 1, respectively. The DC-DC converter 220 has a circuit configuration that is the same as the circuit configuration of the DC-DC converter 120A illustrated in FIG. 2.

The input terminals 221A1 and 221A2 of the DC-DC converter 220 are connected to the two output terminals of the chopper circuit 110, respectively. The output terminals 222A1 and 222A2 of the DC-DC converter 220 are connected to the primary coil 131A of the transformer 130A and the primary coil 131B of the transformer 130B, respectively.

The primary coil 131A of the transformer 130A and the primary coil 131B of the transformer 130B are connected to two lines branching on the output side of the DC-DC converter 220, respectively. Between the two lines, the line connected to the primary coil 131A forms an example of a first line. The line connected to the primary coil 131B forms an example of a second line. Hence, the primary coil 131A and the primary coil 131B are mutually connected in parallel.

In addition, the current I1 at the output side of the DC-DC converter 220 flows through the capacitor 125A to the primary coil 131A of the transformer 130A. The current I2 at the output side of the DC-DC converter 220 flows through the capacitor 125B to the primary coil 131B of the transformer 131B.

The controller 260 controls the output voltage of the chopper circuit 110, and controls the output voltage of the DC-DC converter 220, based on the terminal voltage V1 of the smoothing capacitor 145A and the terminal voltage V2 of the smoothing capacitor 145B detected by the voltage detector 150. The output voltage of the DC-DC converter 220 may be controlled similarly to the output voltage of the DC-DC converter 120B in the first embodiment illustrated in FIG. 1.

As a precondition, the resonance frequency f1 of the current I1 is set higher than the resonance frequency f2 of the current I2. In addition, the powering time during which the switches S1 and S4 of the DC-DC converter 220 are turned ON, and the powering time during which the switches S2 and S3 of the DC-DC converter 220 are turned ON, are set longer than the half-period of the resonance period of the current I1.

In the electric power converter 200, the output voltage V1 can be adjusted by adjusting the output voltage of the chopper circuit 110, and the output voltage V2 can be adjusted by adjusting the powering time during which the switches S1 and S4 of the DC-DC converter 220 are turned ON, and the powering time during which the switches S2 and S3 of the DC-DC converter 220 are turned ON. These adjustments may be made similarly as in the case of the first embodiment described above.

The second embodiment can thus provide the electric power converter 200 which can adjust the output voltages V1 and V2 using a simple configuration that includes one chopper circuit 110 and one DC-DC converter 220, by satisfying the relationship f1>f2 with respect to the resonance frequency f1 of the current I1 and the resonance frequency f2 of the current I2.

Because the electric power converter 200 has the configuration including one chopper circuit 110 and one DC-DC converter 220, the second embodiment can provide the electric power converter 200 having the configuration that is even simpler than the configuration of the electric power converter 100 in the first embodiment illustrated in FIG. 1.

The electric power converter 200 may include the reactor 126A connected in series to the capacitor 125A, and the reactor 126B connected in series to the capacitor 125B, similarly as in the case of the electric power converter 100M in the modification of the first embodiment illustrated in FIG. 6. Further, instead of providing both the reactors 126A and 126B, the electric power converter 200 may additionally include only one of the reactors 126A and 126B.

According to the embodiments and the modification, it is possible to provide an electric power converter having a simple configuration.

The description above use terms such as "determine", or the like to describe the embodiments, however, such terms are abstractions of the actual operations that are performed. Hence, the actual operations that correspond to such terms may vary depending on the implementation, as is obvious to those skilled in the art.

Although the embodiments are numbered with, for example, "first," or "second," the ordinal numbers do not imply priorities of the embodiments. Many other variations and modifications will be apparent to those skilled in the art.

Further, the present invention is not limited to these embodiments, and various variations, modifications, and substitutions may be made without departing from the scope of the present invention.

What is claimed is:

1. An electric power converter comprising:
   a chopper circuit that converts DC power into DC power at a predetermined voltage;
   a DC-DC converter coupled to an output side of the chopper circuit;
   a first transformer, coupled to an output side of the DC-DC converter, and including a first primary coil and a first secondary coil;
   a second transformer, coupled to the output side of the DC-DC converter, and including a second primary coil and a second secondary coil;
   a first capacitor coupled in series between the output side of the DC-DC converter and the first primary coil;
   a second capacitor coupled in series between the output side of the DC-DC converter and the second primary coil;
   a first rectifier circuit coupled to the first secondary coil; and
   a second rectifier circuit coupled to the second secondary coil,
   wherein a half-period of a first current flowing from the DC-DC converter to the first capacitor is shorter than a powering time of the DC-DC converter, so that a first output voltage of the first rectifier circuit is adjusted by adjusting an output voltage of the chopper circuit, and
   wherein a time during which a second current flows from the DC-DC converter to the second capacitor is a half-period of the second current or shorter, so that a second output voltage of the second rectifier circuit is adjusted by adjusting the powering time during one switching period of the DC-DC converter.

2. The electric power converter as claimed in claim 1, wherein
   the DC-DC converter includes a first converter and a second converter that are coupled in parallel to the output side of the chopper circuit,
   the first primary coil is coupled to an output side of the first converter,
   the second primary coil is coupled to an output side of the second converter,
   the first capacitor is coupled in series between the first converter and the first primary coil, and
   the second capacitor is coupled in series between the second converter and the second primary coil.

3. The electric power converter as claimed in claim 1, wherein
   the first primary coil and the second primary coil are coupled to a first line and a second line branching on the output side of the DC-DC converter, respectively,
   the first capacitor is coupled in series between the DC-DC converter and the first primary coil, and
   the second capacitor is coupled in series between the DC-DC converter and the second primary coil.

4. The electric power converter as claimed in claim 1, wherein
   a first resonance frequency of the first current flowing through the first primary coil is determined by a first leak inductance of the first transformer and a first electrostatic capacitance of the first capacitor,
   a second resonance frequency of the second current flowing through the second primary coil is determined by a second leak inductance of the second transformer and a second electrostatic capacitance of the second capacitor, and
   the first resonance frequency is higher than the second resonance frequency.

5. The electric power converter as claimed in claim 1, further comprising:
   a first reactor coupled in series to the first capacitor, between the DC-DC converter and the first primary coil; and
   a second reactor coupled in series to the second capacitor, between the DC-DC converter and the second primary coil.

6. The electric power converter as claimed in claim 5, wherein
   the DC-DC converter includes a first converter and a second converter that are coupled in parallel to the output side of the chopper circuit,
   the first primary coil is coupled to an output side of the first converter,
   the second primary coil is coupled to an output side of the second converter,
   the first capacitor and the first reactor are coupled in series between the first converter and the first primary coil, and
   the second capacitor and the second reactor are coupled in series between the second converter and the second primary coil.

7. The electric power converter as claimed in claim 5, wherein the first primary coil and the second primary coil are coupled to a first line and a second line branching on the output side of the DC-DC converter, respectively, the first capacitor and the first reactor are coupled in series between the DC-DC converter and the first primary coil, and the second capacitor and the second reactor are coupled in series between the DC-DC converter and the second primary coil.

8. The electric power converter as claimed in claim 5, wherein a first resonance frequency of the first current flowing through the first primary coil is determined by a first leak inductance of the first transformer, a first inductance of the first reactor, and a first electrostatic capacitance of the first capacitor, a second resonance frequency of the second current flowing through the second primary coil is determined by a second leak inductance of the second transformer, a second inductance of the second reactor, and a second electrostatic capacitance of the second capacitor, and the first resonance frequency is higher than the second resonance frequency.

9. The electric power converter as claimed in claim 1, further comprising:

a first smoothing capacitor coupled between two output terminals of the first rectifier circuit;

a second smoothing capacitor coupled between two output terminals of the second rectifier circuit;

a first voltage sensor that detects a first terminal voltage of the first smoothing capacitor;

a second voltage sensor that detects a second terminal voltage of the second smoothing capacitor;

a voltage detector, coupled to the first voltage sensor and the second voltage sensor, and configured to output signals respectively representing the first terminal voltage and the second terminal voltage; and a controller configured to control the output voltage of the chopper circuit and an output voltage of the DC-DC converter, based on the signals output from the voltage detector.

* * * * *